US008797160B1

(12) United States Patent
Meyers

(10) Patent No.: US 8,797,160 B1
(45) Date of Patent: Aug. 5, 2014

(54) APPARATUS FOR TAMPER PROOF SECURITY MECHANISM AND TAMPER EVIDENT INDICATOR

(75) Inventor: Richard C. Meyers, Longboat Key, FL (US)

(73) Assignee: GlobalTrak, LLC, Dulles, VA (US)

( * ) Notice: Subject to any disclaimer, the term of this patent is extended or adjusted under 35 U.S.C. 154(b) by 119 days.

(21) Appl. No.: 13/345,571

(22) Filed: Jan. 6, 2012

Related U.S. Application Data

(60) Provisional application No. 61/430,363, filed on Jan. 6, 2011.

(51) Int. Cl.
G08B 13/00 (2006.01)
(52) U.S. Cl.
USPC .................... 340/541; 340/568.1; 340/539.13
(58) Field of Classification Search
USPC ........... 340/541, 568.1, 572.1, 686.1, 539.11, 340/539.13, 635, 652
See application file for complete search history.

(56) References Cited

U.S. PATENT DOCUMENTS

| 7,394,381 | B2 * | 7/2008 | Hanson et al. | 340/572.4 |
| 2004/0041706 | A1 * | 3/2004 | Stratmoen et al. | 340/539.26 |
| 2004/0189466 | A1 * | 9/2004 | Morales | 340/539.26 |
| 2005/0275537 | A1 * | 12/2005 | Kerr et al. | 340/568.2 |
| 2006/0181413 | A1 * | 8/2006 | Mostov | 340/539.22 |
| 2006/0187033 | A1 * | 8/2006 | Hall et al. | 340/539.22 |
| 2009/0108596 | A1 * | 4/2009 | Terry et al. | 292/327 |
| 2009/0212226 | A1 * | 8/2009 | Britton et al. | 250/370.07 |

* cited by examiner

Primary Examiner — Daniel Previl

(57) ABSTRACT

A system, apparatus, and method for a high degree of container security using tamper evident indicator is provided. According to one embodiment, the tamper evident indicator may be a visible alarm, an audible alarm, or their combinations. Further, the tamper evident indicator may be incorporated into a smart container monitoring system. More specifically, the tamper evident indicator may be linked to a mesh network, thus a primary container in a set of linked containers may alert inspectors to other containers that have been tampered.

9 Claims, 2 Drawing Sheets

APPARATUS FOR TAMPER PROOF SECURITY MECHANISM AND TAMPER EVIDENT INDICATOR

PRIORITY CLAIM

The present invention claims priority to U.S. Provisional Application No. 61/430,363, filed Jan. 6, 2011.

BACKGROUND AND FIELD OF THE PRESENT INVENTION

1. Field of the Present Invention

The present invention relates generally to container security and, more particularly, to a container security system in which containers are equipped with indicator systems that alert inspectors to containers that have been compromised.

2. Background of the Invention

Containerized shipping is a critical component of international trade. About 90% of the world's trade is transported in cargo containers and almost half of incoming U.S. trade (by value) arrives by containers onboard ships. More than seven million cargo containers arrive on ships and are offloaded at U.S. seaports each year. As terrorist organizations have increasingly turned to destroying economic infrastructure to make an impact on nations, the vulnerability of international shipping has come under scrutiny.

The Container Security Initiative (CSI) was launched in 2002 by the U.S. Bureau of Customs and Border Protection (CBP), an agency of the Department of Homeland Security. Under the CSI program, the screening of containers that pose a risk for terrorism is accomplished by teams of CBP officials deployed to work in concert with their host nation counterparts. Its purpose was to increase security for container cargo shipped to the United States. As the CBP puts it, the intent is to "extend the zone of security outward so that American borders are the last line of defense, not the first." The CSI consists of four core elements which include: using intelligence and automated information to identify and target containers that pose a risk for terrorism; pre-screening those containers that pose a risk at the port of departure before they arrive at U.S. ports; using detection technology to quickly pre-screen containers that pose a risk; and using smarter, tamper-evident containers.

DESCRIPTION OF RELATED ART

As of Oct. 15, 2008, the SAFE Port Act requires that all containers entering the U.S. from foreign ports of origin (including those from non C-TPAT members) must be secured with a high-barrier security seal that conforms to strength values as specified in the ISO/DIS 17712 Standard. One hundred sixty-six member countries of the World Customs Organization (WCO) have signed "The Framework of Standards to Secure and Facilitate Global Trade." Such seal integrity programs will be based on the use of a high-security mechanical seal as presented in ISO 17712 at the point of stuffing E-seals are transmitting devices that can be used by shippers and enforcement agencies desiring to track shipments and that can also help determine shipment status and shipment integrity. E-seals can report their positions and are able to record the time that they were activated, compromised, and/or removed.

Generally, both mechanical seals and e-seals are attached to the container's door locking bar by inserting a locking pin into the transmitter (seal body) that can only be removed by cutting the pin. If a high-security seal can be cut away by bolt cutters, then it is feasible that the seal may be cut away, the container contents violated, and a replica of the destroyed seal be replaced without detection. Accordingly, conventional seals are limited and will not fully protect a targeted container from being breached. Nor will it trigger any alerts when inspectors survey the container externally at a checkpoint.

SUMMARY OF THE PRESENT INVENTION

To address the problems and limitations noted above, the present invention provides a fail-safe programmable digital locking system with an alarm indicator that is tamper-proof and which also provides a means to control container access. With the present invention, existing containers may be retrofitted enabling a company to upgrade the security of their cargo containers with minimal effect on operations while achieving maximum security. Once stuffed and programmed to lock, the container's security device can be queried by anyone with access to the system. The present invention may decrease the time spent per container at the inspection checkpoints as any breach in the container will be immediately evident by a visible exterior indicator light or other indicator on the container to alert inspectors regarding container status.

Additionally, the present invention may include an internal sensor suite, an external sensor suite, a GPS unit for real-time location tracking, and a wireless transceiver for remote access to the container at all times. Additional security measures may be added that will use biometrics such as voice recognition in addition to or in lieu of other access means. The present invention would preferably require little or no infrastructure changes at inspection sites.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
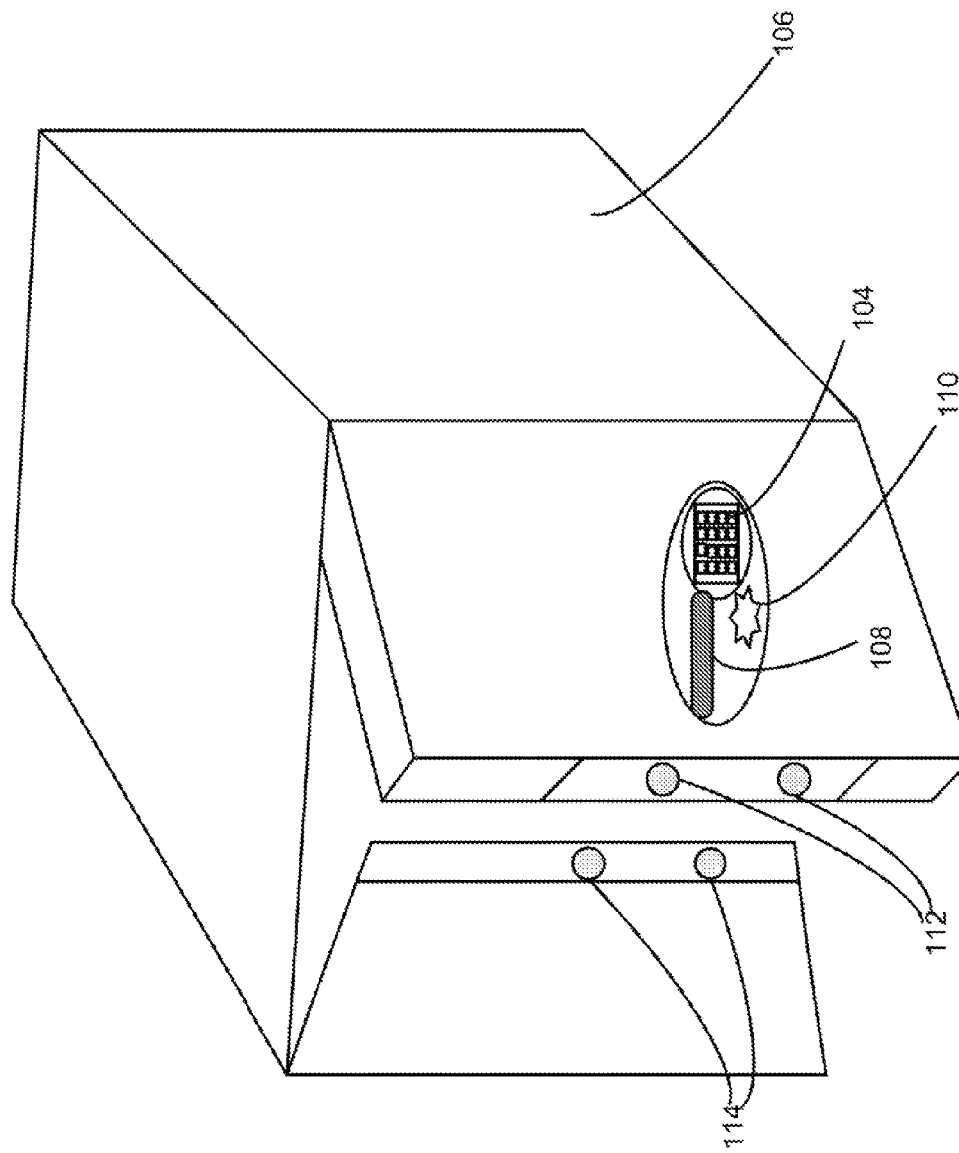
FIG. 1 is a functional configuration of the present invention in accordance with an embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

With reference now to FIG. 1, a functional configuration in accordance with an embodiment of the present invention will now be discussed. As shown in FIG. 1, a tamper-proof cargo container 106 including a programmable digital locking device 104, a tamper-evident indicator light 110, a lever 108 to open cargo doors and entirely disengage locking bolts 112, and resting receptacles for bolts 114. The tamper-evident indicator light 110 may be also be associated with an audible alarm, an green/red indicator light system, a digitally displayed message or any another kind of visible alarm that would be contemplated by one skilled in the art.

Figure 2:
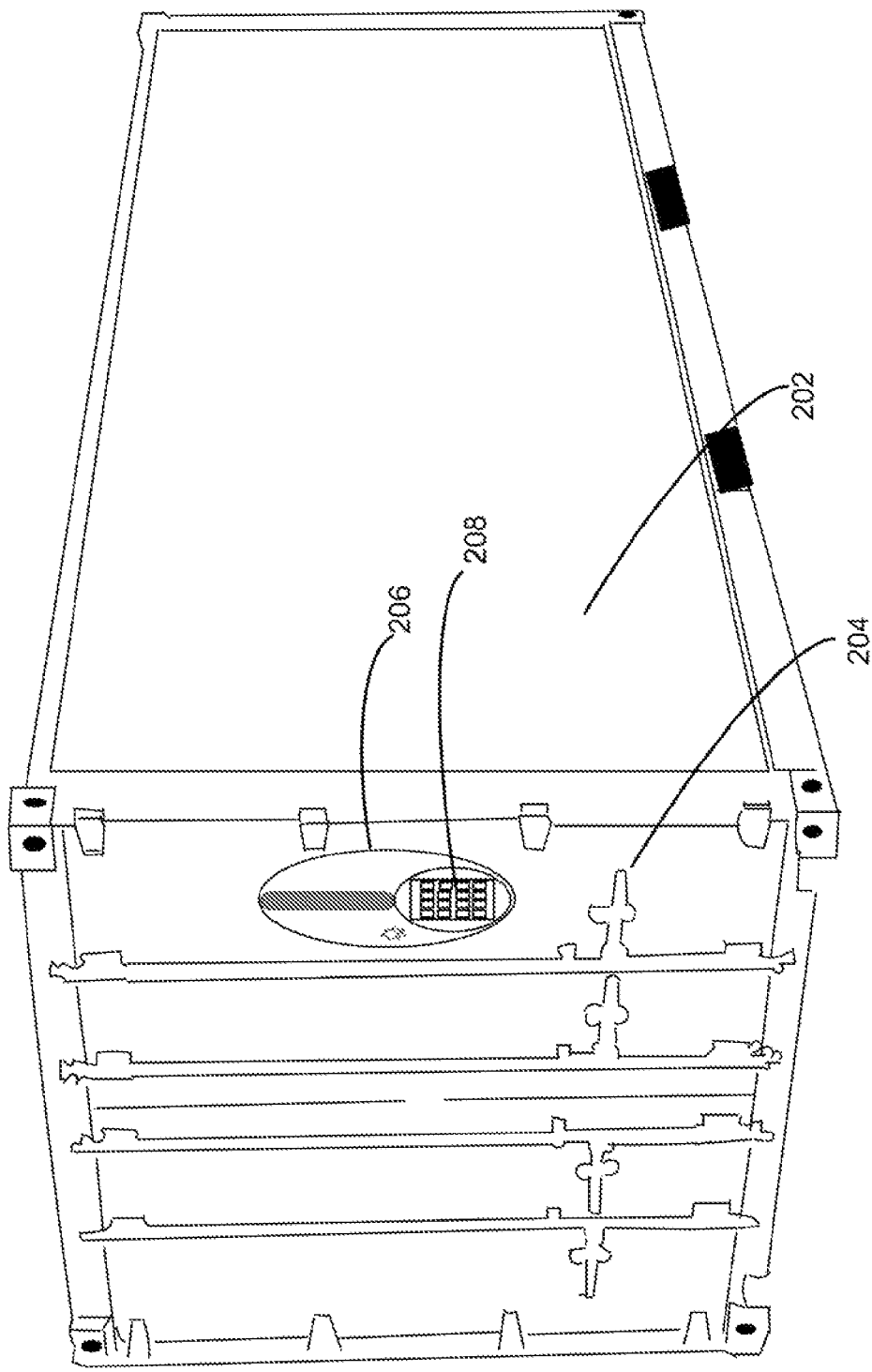
FIG. 2 is a functional configuration of the present invention in accordance with an embodiment of the present invention.

With reference now to FIG. 2, a functional configuration in accordance with the present invention will now be discussed. As shown in FIG. 2, an ISO standard cargo container 202 retrofitted with replacement doors 204 housing a digitally programmed locking device 206. The internal dead bolt is mounted inside the door with the strike going into the jamb of the opposite door. On the outside of the door is the combination entry key pad 208. Inputting the right entry code will release the bolt from the bolt casing inside the opposite door enabling the door to be pulled open. Because the lock is on the inside of the door, accessibility and manipulation of the control mechanism of the present invention is not possible. These locks may be made from a variety of materials the strongest being steel. Preferably there may be 3-6 locking bolts in a cargo container door depending on the size of the container. All other aspects of the cargo container 202 remain structurally and dimensionally the same.

The locking device and alarm system of the present invention provide greater security for the shipping company because the system can only be accessed by authorized personnel. Preferably, the system will decrease any risk of tampering. However, if the system has been compromised then an indicator will alert inspection authorities to regard such a container as a higher risk potential. Still further, the entry system may include a voice activation system which uses voice verification and authentication as a primarily authorization means.

According to an alternative embodiment, the present invention may further include a smart container monitoring device with a real time location finder, remote access and internal and external sensor suites. Further, each of these devices may be linked via a mesh network. When a smart container is linked to other smart containers in vicinity via a mesh network, it may propagate a message in the mesh network when tampering is detected. This ability allows a single container to act as a primary container within a network to indicate tampering to any one of a set of linked containers. In this configuration, the primary container may be configured to generate distinct alarms to distinguish tampering to the primary container from tampering to other containers in the network.

According to one preferred embodiment, the e-seal of the present invention may include a reusable seal body and a disposable seal strap. The e-seal may be activated by the insertion of the strap. In another preferred embodiment, the e-seal may include a reusable seal body and a disposable bolt and a disposable lock cap. Alternatively, a padlock version of a lock cap with a reusable bolt may be used together with the reusable seal body. The e-seal may be activated by the insertion of the bolt. In a standard e-seal tracking mode, the e-seal may be applied externally to physically lock the container door. Preferably, any cut, removal of the strap/bolt, or other types of tampering of the e-seal is immediately detected. In an alternative embodiment, the e-seal may also be used as an embedded tracking device by using a dummy bolt to activate the unit.

The e-seal may be powered by a non-rechargeable battery or rechargeable battery. Each e-seal preferably contains a unique ID number. The e-seal may be read using a RFID reader. In more advanced embodiment, the e-seal may be capable of communicating with other devices such as the smart container monitoring unit via a ZigBee wireless network. The e-seal may further transmit reports to a monitoring station via a cellular network or store the reports when a network is not available. Furthermore, the e-seal may preferably utilize 2-way cellular communication to determine the approximate location of the device when GPS is not available.

Communication System

In accordance with a preferred embodiment of the present invention, the reporting may be made via a wireless connection to a satellite mode to communicate with a satellite system such as Globalstar™ or Orbcomm™. Preferably, such a satellite device will be a device such as the Axxon™, AutoTracker™, or the like, or a customized Orbcomm™ VHF satellite GPS tracking communications device which may be adapted with Zigbee™ interface antenna devices to incorporate them into the overall LAN architecture of the security system; these devices include a satellite transceiver, GPS receiver, a customized Zigbee™ wireless antenna with a serial (Ax Tracker™) or duplex (OrbComm™) interface.

In accordance with an alternative preferred embodiment of the present invention, the reporting may also be made using a wireless system independent from the satellite system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the Zigbee™ (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

As referred to above, all communications of the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from present invention as needed. For example, as detailed above, each system and subsystem of the present invention may be designed to send, receive, report and request information via the wireless and/or satellite systems so as to continually maintain and update the container systems.

Additional communications with the communications manager are preferably enabled via industry standard wired interfaces, with communications protocols implemented in firmware for future upgrade. These interfaces preferably will include at least two RS-322 compatible serial ports. These alternate serial ports may assist the communications manager to interface with additional remote sensors as well as other local reader/controllers such as an RFID reader or other devices.

Remote Monitoring

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data Interchange, XML, E-mail, HTML and flat text files. After receiving such data, the data fusion center preferably would act to process information to identify anomalies. With this data collected and processed, analyst may calculate statistics and probability of detection models used for decision support. In short, such a data fusion center would preferably provide a consolidated source of information that could be used to assist agencies and shippers.

What is claimed is:

1. A cargo container security apparatus for securing a first cargo container, the apparatus comprising:
   a tamper-evident indicator;
   a digitally programmed locking device;
   a wireless transceiver element, wherein the wireless transceiver element is configured to send and receive wireless signals to and from at least a second cargo container; and
   a microcontroller, wherein the microcontroller is capable of determining the occurrence of an alarm event related to the first cargo container and generating a first alarm via a tamper-evident indicator; wherein the microcontroller is further configured to receive an alert message indicating that an alarm event related to the second cargo container has occurred; wherein the microcontroller is further configured to provide an alarm based on the alert message received from the second cargo container; and further wherein the microcontroller is configured to indicate which cargo container triggered the alarm.

2. The apparatus of claim 1, wherein the tamper-evident indicator is configured to generate an alarm using one type of signal or a combination of signals from the following group comprising:
   an indicator light;
   an audible alarm;
   a visible alarm; and
   a digitally displayed message.

3. The apparatus of claim 1, wherein the apparatus reports an alarm event to a remote monitoring station.

4. A method for managing a tamper-proof cargo container and indicating a suspected event that compromises container security, the method comprising:
   programming a digital locking device on a first container;
   detecting an unauthorized access to the first container; and
   generating an alarm via a tamper-evident indicator on the first container, wherein the first container is wirelessly linked to one or more cargo containers in a given area, and further wherein a second container linked in the network transmits a message to the first container regarding an alarm event, further wherein the tamper-evident indicator indicates which container triggered the alarm event.

5. The method of claim 4, wherein the first container generates an alarm according to the message.

6. The method of claim 5, wherein the first container indicates the second container as an origin of the message.

7. The method of claim 6, wherein the first container is capable of acting as a primary container to generate a visible alarm or an audible alarm on behalf of tampered containers in the mesh network.

8. The method of claim 7, wherein the first container reports an alarm event to a remote monitoring station.

9. The method of claim 6, wherein the first container generates the alarm using one type of signal or a combination of signals from the following group comprising:
   an indicator light;
   an audible alarm;
   a visible alarm; and
   a digitally displayed message.

* * * * *